May 8, 1928.
G. A. YEATON
1,669,152
CHOKER HOOK
Filed May 31, 1927
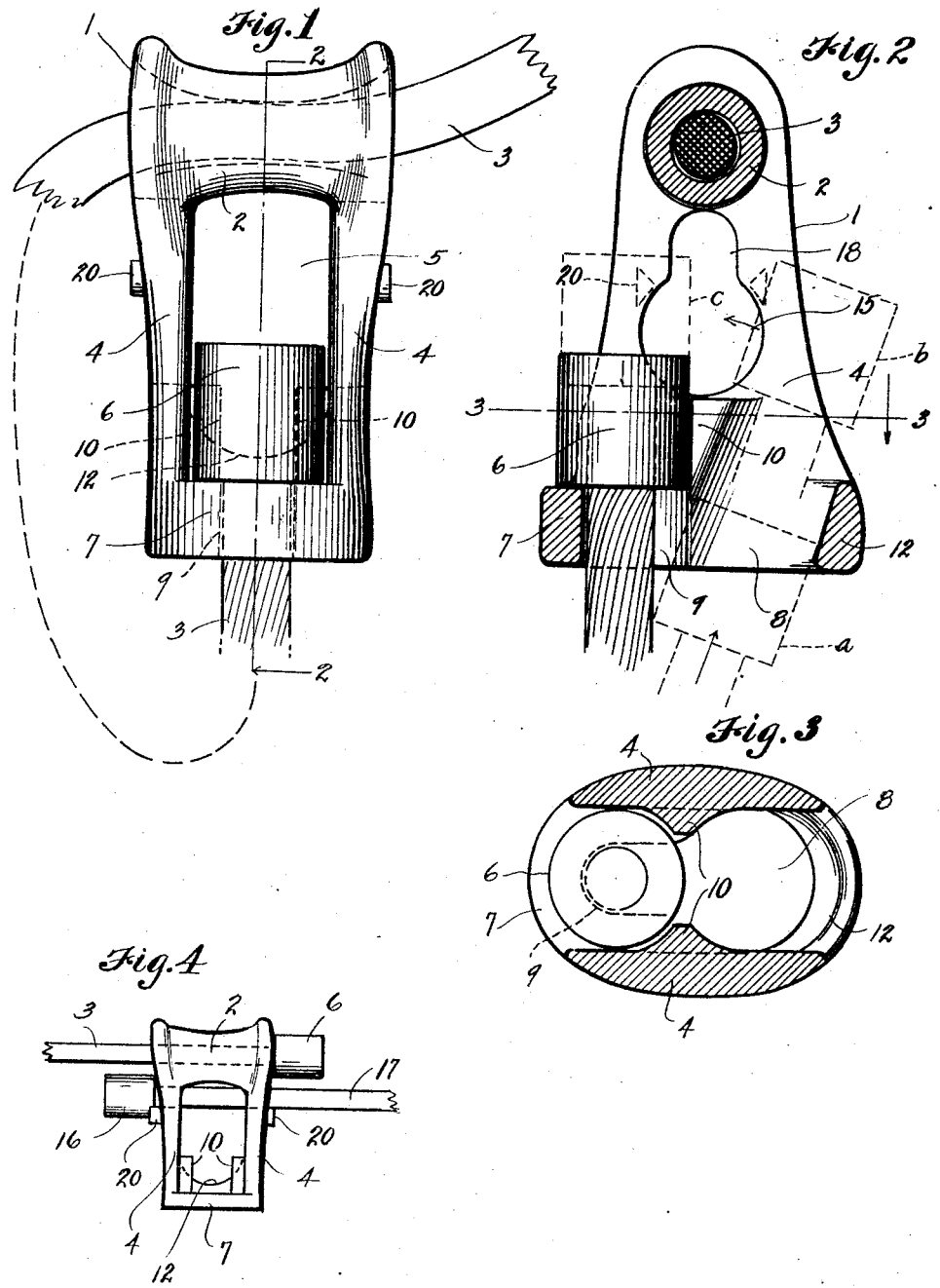
INVENTOR
GEORGE A. YEATON
BY
Cook & Robinson
ATTORNEY Patented May 8, 1928.

1,669,152

UNITED STATES PATENT OFFICE.

GEORGE A. YEATON, OF ABERDEEN, WASHINGTON, ASSIGNOR OF ONE-HALF TO WILLIAM ESALHORST, OF ABERDEEN, WASHINGTON.

CHOKER HOOK.

Application filed May 31, 1927. Serial No. 195,449.

This invention relates to improvements in what are commonly known in the logging industry as choker hooks, and more particularly to hooks of that type used in connection with cables having retaining ferrules, knobs or other enlargements at their ends for effecting the connection of the cable end with the hook body.

It is the principal object of the invention to provide a hook of a construction that permits an easier and quicker application of the cable retaining ferrule to the hook than is possible with hooks now generally used, which is less apt to breakage in use and which is a practical device, easy to manipulate and contains no movable or joined parts.

More specifically stated, the object of the invention resides in the provision of a choker hook having a slip sleeve at one end through which the choker cable is slidably extended and provided at its other end with a seat against which the retaining ferrule at the end of the choker cable may engage and with an entrance to the seat which opens to the end of the hook as distinguished from openings through the side as is the case with practically all hooks of this class now in use.

Other objects of the invention reside in the various details of construction that give strength and rigidity to the hook, so that it is practically indestructible.

A still further object is to so construct the hook body that it may be used as a cable connecting means when it is desired to attach an extension line to the choker cable.

In accomplishing these and other objects of the invention, I have provided the improved details of construction, the preferred forms of which are illustrated in the accompanying drawings, wherein—

Figure 1 is a side view of a choker hook embodied by the present invention, showing the choker cable extended through the slip sleeve and its ferruled end seated within the hook body.

Figure 2 is a vertical section of the same taken substantially on the line 2—2 in Figure 1.

Figure 3 is a horizontal section taken on the line 3—3 in Figure 2.

Figure 4 is a side view of a hook illustrating its use as a cable connecting device.

Referring more in detail to the drawings—

1 designates in its entirety a choker hook embodied by the present invention; this being cast in a single piece with a slip sleeve 2 at one end through which the choker cable 3 is slidably extended. Preferably, the sleeve is flared and rounded out at its ends to facilitate movement of the cable through it and in order to avoid any undue wear on the cable.

Extending in parallel, spaced apart relation from opposite ends of the sleeve portion 2, are side wall members 4—4 of the hook body, providing an intermediate open space or chamber 5 through the hook within which a retaining knob, or ferrule, 6, secured on the end of the choker cable, is disposed when these parts are connected. The end of the hook that is opposite that end containing the sleeve is closed by means of a flat wall 7 which, at one side of the axis of the hook, is provided with an opening 8 of sufficient size that the ferrule 6 may be passed through it into the chamber 5 on attaching the cable to or in detaching it from the hook, and a slot 9 leads laterally from this opening in the wall 7 for passage of the cable 3, but this slot is of insufficient width for passage of the ferrule, so that when the cable end is seated in the slot 9 the inner end of the ferrule will engage with the wall 7 and thus provide a connection between the cable end and the hook body.

Formed on the inner side of the side walls 4—4 of the hook, in oppositely disposed relation, and extending in the axial direction of the hook from the wall 7 and adjacent the mouth of the slot 9, are shoulders 10—10 which prevent direct passage of the ferrule from its seat on the wall 7 into the opening 8. These shoulders are sufficiently spaced to permit passing the cable between them but they serve to retain the ferrule and they terminate at such distance from the sleeve 2 as to permit lateral passage of the ferrule from one side to the other across the shoulders in removing it from or placing it on its seat within the hook. It will be noted that the opening 8 is inclined with respect to the axial line of the hook as a feature of design which permits the base or lower end of the hook body to be made smaller than would be possible if the opening were parallel with the axis of the hook. It is also to be noted that there are no slots opening laterally from the hook body and that the opposite side walls are rigidly connected at their lower ends by the wall 7 and by the connecting portion at the outside of the opening 8, designated by reference numeral 12.

With the device so constructed its use would be as follows: With the choker cable 3 extended slidably through the sleeve 2, it is placed about the log or load to be moved and the ferrule 6 at its end is passed inwardly through the opening 8 sufficiently past the shoulders 10 that it may be moved laterally across the shoulders and dropped onto the seat provided by the wall 7. Tension on the cable then holds the ferrule to its seat while the shoulders prevent lateral displacement toward the opening 8, and the closed end of the slot 9 prevents movement the other way. In connecting the ferrule end of the cable with the hook body, the ferrule is moved successively through the positions shown in dotted lines in Figure 2 at $a$, $b$ and $c$.

To release the cable only sufficient slack is required to permit the ferrule to be lifted over the shoulders 10 and then dropped through the opening 8.

As an added feature, which permits the hook to be used as a cable connecting means, such as might be desired in the event the main choker line was not long enough to reach its load and it would be desirable to connect an extension thereto, the two side walls 4—4 are provided with an alined passage 15 through which the ferrule, or enlargement, as at 16, of an extension cable 17 may be projected. Slots 18 lead laterally from these openings into which the cable may be passed laterally, so as to seat the ferrule 16 against a wall of the hook as is shown in Figure 4. Retaining bosses 20 are provided on the outside of these walls against which the ferrule will engage to prevent its displacement so long as there is tension on the cables 3 and 17. With this construction, the main choker line 3 may be drawn out until its ferrule 6 seats against an end of the sleeve 2 and the extension cable connected to the hook body, which, as so used, serves as a temporary connecting means.

While I have illustrated and described this device as being a choker hook, it is to be understood that I do not wish to be limited only to this particular use for the reason that by slight alteration the hook could be well adapted for use as a bull hook. For such use, the sleeve end would be modified to receive a permanently connected line in place of the slip connection provided with the choker cable. In the event that it is used as a bull hook the end opposite that shown containing the sleeve would remain the same and the extension cable would be connected therewith in the same manner as the connection shown in Figure 2.

Having thus described my invention, what I claim as new therein and desire to secure by Letters-Patent, is:

1. A hook of the character described having a chambered body portion provided with a wall forming a seat, said wall having an opening through which an enlargement at the end of a choker cable may be projected, and a slot leading laterally from the said opening into the wall for passing the cable to seat the said enlargement.

2. A hook of the character described having a chambered body portion provided with a wall forming a seat and provided with an opening through which an enlargement at the end of a choker cable may be projected, a slot leading laterally from the said opening into the seat for passing the cable to seat the said enlargement and retaining shoulders formed on the sides of the chamber over which the said enlargement must be lifted to seat or unseat it.

3. A choker hook body having a chambered body portion with a slip sleeve at one end through which a choker cable may be extended and a wall at its other end forming a seat and provided with an opening through which an enlargement at the end of the choker cable may be projected into the chamber, and a slot leading laterally from the opening into the seat for passing the cable to seat the said enlargement.

4. A choker hook body having a chambered body portion with a slip sleeve at one end through which a choker cable may be extended and a wall at its other end forming a seat and provided with an opening through which an enlargement at the end of the choker cable may be projected into the chamber, and a slot leading laterally from the opening into the said seat for passing the cable to seat the said enlargement and shoulders formed on opposite sides of the chamber and adjacent the mouth of the laterally directed slot over which the enlargement must be lifted in seating it and which serves to retain it against displacement from its seat.

5. In combination, a choker cable having a retaining enlargement at its end and a choker hook having a chambered body portion with a slip sleeve at one end through which the choker cable is slidably extended and a wall at its other end forming a seat and provided with an opening through which the retaining enlargement may be projected into the chamber and with a slot leading laterally from the opening into the seat for passing the cable to seat the enlargement, and shoulders formed on the opposite walls of the chamber adjacent the mouth of the slot between which the cable may be passed and over which the enlargement must be lifted in seating or removing it from the hook.

6. A hook as in claim 5, provided in its opposite side walls with alined openings for passing a cable enlargement and slots leading laterally from the openings for passing the cable to permit the enlargement to be seated against a wall of the hook.

7. A hook as in claim 5, provided in its opposite side walls with alined openings for passing a cable enlargement, and slots leading laterally from the openings for passing a cable to permit the enlargement to be seated against a wall of the hook and retaining bosses formed on the walls for engaging the enlargement.

Signed at Seattle, Washington, this 28th day of April, 1927.

GEORGE A. YEATON.